(12) United States Patent
Feldmann

(10) Patent No.: US 10,062,220 B2
(45) Date of Patent: Aug. 28, 2018

(54) METHOD FOR OPERATING A DRIVE DEVICE OF A MOTOR VEHICLE AND CORRESPONDING DRIVE DEVICE

(71) Applicant: AUDI AG, Ingolstadt (DE)

(72) Inventor: Uwe Feldmann, Nassenfels (DE)

(73) Assignee: Audi AG, Ingolstadt (DE)

( * ) Notice: Subject to any disclaimer, the term of this patent is extended or adjusted under 35 U.S.C. 154(b) by 96 days.

(21) Appl. No.: 15/319,282

(22) PCT Filed: Jun. 22, 2015

(86) PCT No.: PCT/EP2015/001254
§ 371 (c)(1),
(2) Date: Dec. 15, 2016

(87) PCT Pub. No.: WO2015/197183
PCT Pub. Date: Dec. 30, 2015

(65) Prior Publication Data
US 2017/0140582 A1    May 18, 2017

(30) Foreign Application Priority Data
Jun. 28, 2014  (DE) .................. 10 2014 009 715

(51) Int. Cl.
*G07C 5/08* (2006.01)
*B60K 6/26* (2007.10)

(52) U.S. Cl.
CPC .............. *G07C 5/0808* (2013.01); *B60K 6/26* (2013.01); *B60Y 2200/91* (2013.01);
(Continued)

(58) Field of Classification Search
None
See application file for complete search history.

(56) References Cited

U.S. PATENT DOCUMENTS 7,294,988 B2 * 11/2007 Ajima ...................... B60K 6/26
                                                          318/430
7,973,502 B2 *  7/2011 Nakagawa .............. G01B 7/30
                                                          310/191
(Continued)

FOREIGN PATENT DOCUMENTS

CN        101801750 A      8/2010
CN        102123897 A      7/2011
(Continued)

OTHER PUBLICATIONS

International Search Report issued by the European Patent Office in International Application PCT/EP2015/001254.
(Continued)

*Primary Examiner* — Rami Khatib
(74) *Attorney, Agent, or Firm* — Henry M. Feiereisen LLC

(57) ABSTRACT

A method for operating a drive device of a motor vehicle which has at least one electric machine with a phase angle detector and an output shaft operatively connectable with the electric machine, includes: when a return value of the phase angle detector of the electric machine is constant, performing a first diagnostic operating mode of the drive device, in which the operative connection between the electric machine and the output shaft is interrupted, subsequent, the electric machine is controlled by open lop control to a defined rotational speed, and when the return value continues to be constant after controlling the electric machine to the defined rotational speed, a first operating state of the phase angle detector is recognized and otherwise a correct function of the phase angle detector is recognized.

11 Claims, 1 Drawing Sheet

(52) U.S. Cl.
  CPC ..... *B60Y 2200/92* (2013.01); *B60Y 2400/301* (2013.01); *Y10S 903/906* (2013.01)

(56) References Cited

U.S. PATENT DOCUMENTS

| | | | |
|---|---|---|---|
| 8,773,054 B2 * | 7/2014 | Goto | B60W 10/08 318/400.07 |
| 2005/0096865 A1 * | 5/2005 | Sugiura | F02D 41/009 702/151 |
| 2009/0133947 A1 * | 5/2009 | Yoshihara | B60K 6/48 180/65.285 |
| 2013/0271051 A1 | 10/2013 | Goto et al. | |
| 2016/0348603 A1 * | 12/2016 | Mikawa | F02D 41/009 |
| 2017/0074179 A1 * | 3/2017 | Mikawa | F02D 41/26 |

FOREIGN PATENT DOCUMENTS

| | | |
|---|---|---|
| CN | 103237705 A | 8/2013 |
| CN | 103338958 A | 10/2013 |
| DE | 10 2011 003 758 A1 | 8/2012 |
| DE | 102011075145 | 11/2012 |
| DE | 10 2011 089 101 A1 | 6/2013 |
| DE | 11 2011 104 614 T5 | 10/2013 |

OTHER PUBLICATIONS

Chinese Search Report dated Mar. 27, 2018 with respect to counterpart Chinese patent application 2015800350559.

English Translation of Chinese Search Report dated Mar. 27, 2018 with respect to counterpart Chinese patent application 2015800350559.

\* cited by examiner

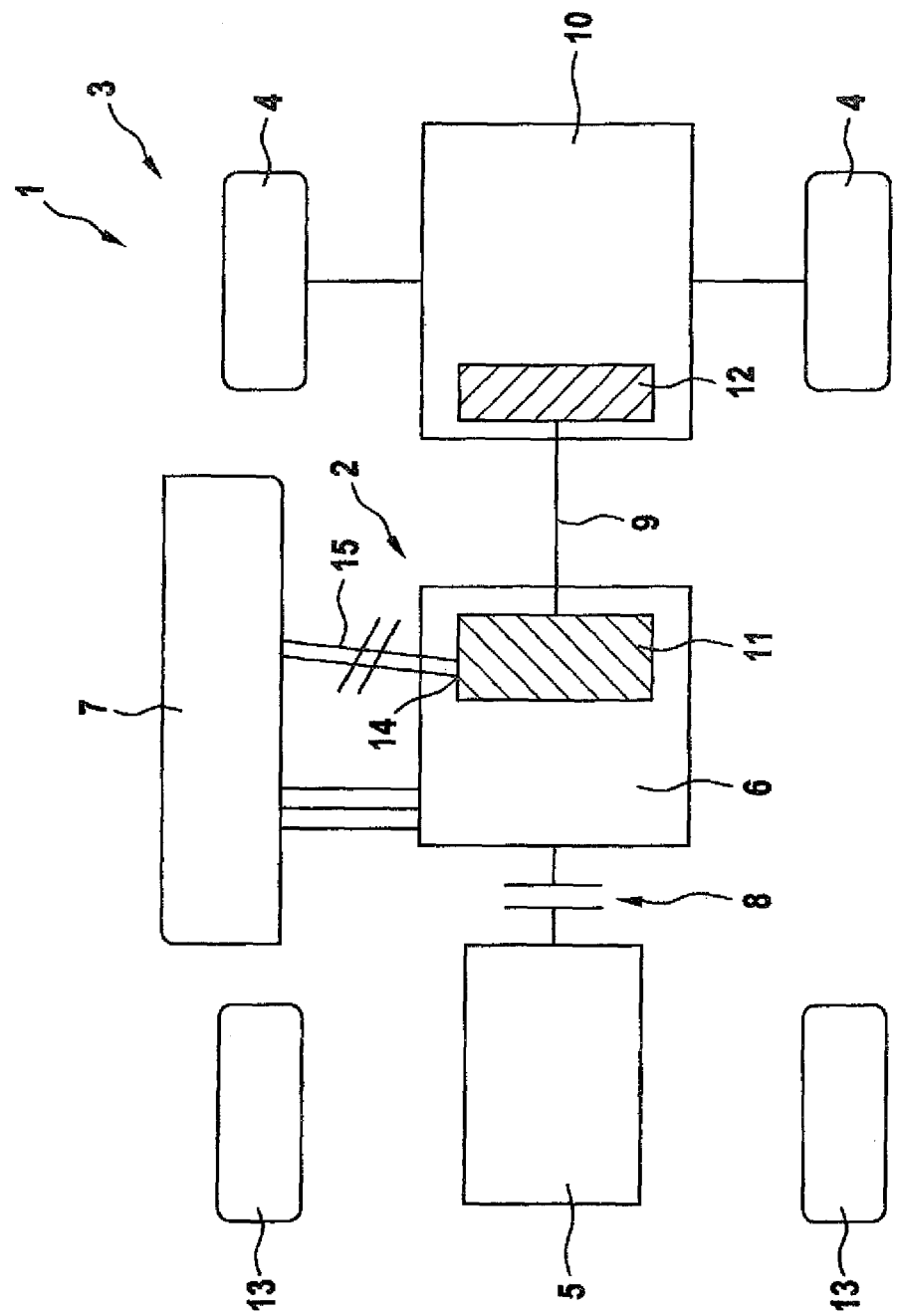

METHOD FOR OPERATING A DRIVE DEVICE OF A MOTOR VEHICLE AND CORRESPONDING DRIVE DEVICE

CROSS-REFERENCES TO RELATED APPLICATIONS

This application is the U.S. National Stage of International Application No. PCT/EP2015/001254, filed Jun. 22, 2015, which designated the United States and has been published as International Publication No. WO 2015/197183 and which claims the priority of German Patent Application, Serial No. 10 2014 009 715.3, filed Jun. 28, 2014, pursuant to 35 U.S.C. 119(a)-(d).

BACKGROUND OF THE INVENTION

The invention relates to a method for operating a drive device of a motor vehicle, which has at least one electric machine with a phase angle detector and a drive shaft that can be operatively connected with the electric machine. The invention also relates to a drive device.

The method serves for operating the drive device of the motor vehicle. Hereby the drive device for example provides a torque that is directed towards driving the motor vehicle, in particular towards accelerating or decelerating the motor vehicle. The drive device includes the electric machine. Hereby it can be provided that the drive device only include the electric machine and is insofar configured as electric drive device. As an alternative of course beside the electric machine the drive device can also include a further drive aggregate, in particular an internal combustion engine. In this case the drive device is configured as a hybrid drive devices. The output shaft can be operatively connected with the electric machine. For example the output shaft is permanently operatively connected with at least one axle or at least one wheel of the axle of the motor vehicle. For example the operative connection between the electric machine and the output shaft is established via at least one manual transmission and/or a shifting clutch.

The phase angle detector serves for detecting a phase position or a rotary angle position of the electric machine in particular of a rotor and/or a motor shaft of the electric machine. The phase angle can for example be used for controlling the electric machine in particular for commuting the electric machine. The phase angle detector can also be referred to as rotary encoder or rotary angle encoder. In particular it is configured as an angular position sensor preferably as incremental angular position sensor or absolute angle encoder. Of course also other configurations can be realized.

For example the phase angle detector is configured not to output a signal when the electric machine has a defined phase angle or one of multiple phase angles. Outside of the phase angle or the phase angles n the other hand the phase angle detector outputs a signal. Thus when a defect of the phase angle detector and/or a connecting line which connects the phase angle detector with a control device of the electric machine is present, it may be that no signal of the phase angle detector is recognized and insofar for example received by the control device that the defined rotation angle or one of the defined rotation angles is present.

However beside a defect the constant return value of the phase angle detector can also have other causes. For example the phase angle detector and/or its connection line may be defective. As an alternative it is also possible that the electric machine outputs a torque which is not sufficient however to move the moor vehicle. This is for example the case when the motor vehicle stands on a slope or an obstacle is present, for example a curb against which at least one of the wheels of the motor vehicle pushes. The latter can also occur due to a steering wheel angle when the motor vehicle stands next to a curb, i.e., the motor vehicle stands essentially parallel to the curb.

SUMMARY OF THE INVENTION

It is an object of the invention to propose a method for operating a drive device of a motor vehicle by means of which a diagnosis of the phase angle detector can be realized in a simple manner and which can in addition be implemented easily and cost-effectively.

This is achieved according to the invention with the features of the independent method claim. Hereby it is provided that when the return value of the phase angle detector is constant a first diagnostic operating mode of the drive device is performed, wherein the operative connection between the electric machine and the output shaft is interrupted, the electric machine is subsequently adjusted to a defined rotational speed and when the return value continues to remain constant a first operating state and otherwise a correct functioning of the phase angle detector is recognized. As soon as the return value of the phase angle detector remains constant, in particular over a defined period of time which is for example longer than a period of time over which the return value remains constant at a smallest possible rotational speed of the electric machine, a possible defect of the phase angle detector is recognized and the first diagnostic operating mode is initiated.

The first diagnostic operating mode is in particular performed when the return value of the phase angle detector remains constant even though the electric machine is controlled in open loop and/or closed loop control to generate a torque. For example a setpoint torque is thus set at the electric machine, which is different from zero. When the setpoint torque is set at the electric machine and the determined phase angle still remains constant the diagnosis of the phase angle detector is performed, in particular by switching into the first diagnostic operating mode.

At the beginning of the first diagnostic operating mode the operative connection between the electric machine and the output shaft is first interrupted. Subsequently a setpoint rotational speed of the electric machine is set to the defined rotational speed and subsequently the electric machine is controlled by open loop control to this setpoint rotational speed and thus the existing rotational speed. The open loop control of the electric machine hereby is performed in a known manner. When the return value still remains constant, in particular over the previously described time period, the first operating state of the phase angle detector or the drive device is recognized. On the other hand when the return value changes it is assumed that the phase angle detector works properly and thus its proper function is recognized. When the first operating state is present or is recognized because the return value continues to be constant the diagnosis can either be continued or alternatively a defect of the phase angle detector can already be recognized.

A further embodiment of the invention provides that the operative connection is interrupted with a manual transmission, which is brought into a neutral position and/or with a shifting clutch, which is opened. The operative connection between the electric machine and the output shaft is thus generated via the shifting transmission and/or the shifting clutch. The term shifting transmission means a transmission, which enables engagement of multiple gears or transmission ratios, for example multiple drive gears. Also a reverse gear can be engaged with the shifting transmission. For interrupting the operative connection the shifting transmission is brought into a neutral position in which an input shaft is decoupled from an output shaft of the shifting transmission. In addition or as an alternative the shifting clutch can be used to interrupt the operative connection. For this purpose the shifting clutch is opened, in particular completely, so that its input shaft is completely decoupled from its output shaft.

A preferred embodiment of the invention provides that the drive device has a drive aggregate, which can be operatively connected with the electric machine via a separating clutch, wherein the operative connection is interrupted upon initiation of the first diagnostic operating mode by means of the separating clutch. As explained above the drive aggregate can be an internal combustion engine. Between the electric machine and the drive aggregate the separating clutch is present so that the operative connection between the drive aggregate an the electric machine can be interrupted by correspondingly adjusting the separating clutch. Preferably the drive aggregate is completely decoupled from the electric machine when the separating clutch is open. Preferably this is additionally the case for the output shaft and the shifting transmission. When the separating clutch is open the drive aggregate is thus completely decoupled from further regions of the drive device and also from the at least one axle or the at least one wheel of the motor vehicle.

A preferred embodiment of the invention provides that when the first operating state is recognized a second diagnostic operating mode is performed, wherein by means of a rotational speed sensor the rotational speed of a shaft that is permanently operatively connected with the electric machine is determined, wherein at a rotational speed that is different from zero a defect of the phase angle detector is recognized and otherwise a second operating state is recognized. Thus according to the description above when the first operating state is recognized switching is performed from the first diagnostic operating mode into the second diagnostic operating mode or the second diagnostic operating mode is initiated. In the second diagnostic operating mode it is provided to determine the rotational speed of the shaft by means of the rotational speed sensor. Because the shaft is permanently and preferably rigidly operatively connected with the electric machine this also allow determining the rotational speed of the electric machine.

The rotational speed sensor is for example assigned to the shifting transmission, in particular to its input shaft. This means that also when the shifting transmission is in the neutral position the shaft is operatively connected with the electric machine. The shaft corresponds for example to the input shaft of the shifting transmission. When the rotational speed is different from zero a defect of the phase angle detector can be assumed, in particular when the return value of the phase angle detector remains to be, and is thus simultaneously, constant. However, when the rotational speed is zero and preferably the return value of the phase angle detector at the same time remains constant it cannot unequivocally be concluded whether the defect is present. Correspondingly the second operating state is recognized. It can be provided that when recognizing the second operating state also the defect of the phase angle detector is already recognized. Preferably however the diagnosis of the phase angle detector is continued.

Particularly preferably, according to an embodiment of the invention it is provided that when recognizing the second operating state a third diagnostic operating mode is performed in which the electric machine is controlled by open loop or closed loop control to the defined rotational speed, wherein the open loop includes pre-control to a defined rotational speed. For continuing the diagnosis when recognizing the second operating state the third diagnostic operating mode is used. Correspondingly in this case a change is performed from the second diagnostic operating mode into the third diagnostic operating mode or the third diagnostic operating mode is initiated. In the third diagnostic operating mode the setpoint rotational speed of the electric machine is adjusted to the defined rotational speed. Subsequently the electric machine is adjusted by closed loop control to this setpoint rotational speed or controlled by open loop control by using a pre-control. The control of the electric machine by closed loop control or the controlling with open loop control by means of the pre-control is performed without the return value of the phase angle detector. The phase angle detector is insofar not used for controlling the electric machine in the third diagnostic operating mode.

In a further embodiment of the invention it is for example it is provided that when the return value remains to be constant in the third diagnostic operating mode a third operating state is recognized and otherwise a correct functioning of the phase angle detector is recognized. When the return value continues to remain constant again no unequivocal conclusions whether the defect phase angle detector is defective can be drawn. Correspondingly the third operating state is recognized. On the other hand when the return value changes it is concluded that the phase angle detector functions properly. When the third operating state is recognized it can be provided that the error of the phase angle detector is already determined. Preferably however the diagnosis is continued.

A further embodiment of the invention provides that when recognizing the third operating state a fourth diagnostic operating mode is performed in which by means of the rotational speed sensor the rotational speed of the shaft that is permanently operatively connected with the electric machine is determined, wherein when the rotational speed is different from zero a defect of the phase angle detector is recognized. In the fourth diagnostic operating mode the rotational speed sensor is thus again used to determine the rotational speed of the shaft and thus the rotational speed of the electric machine. In addition, in the fourth diagnostic operating mode the adjustment of the electric machine by closed loop control or open loop control to the defined rotational speed is performed as explained above for the third diagnostic operating mode. Analogous to the second diagnostic operating mode, in the fourth diagnostic operating mode the error of the phase angle detector is recognized as soon as the rotational speed is different from zero and in particular the return value of the phase angle detector remains to be constant. On the other hand when the rotational speed is zero while the return value of the phase angle detector remains to be constant the defect of the phase angle detector cannot be clearly concluded. Correspondingly for example a normal function can be assumed.

A further preferred embodiment of the invention provides to switch from the fourth diagnostic operating mode into the first diagnostic operating mode, in particular after a defined period of time, when the rotational speed in the fourth operating mode is zero. As explained above in the fourth diagnostic operating mode the defect of the phase angle detector cannot be unequivocally recognized when the rotational speed is zero and the return value remains to be constant. Correspondingly it can be provided to repeat the aforementioned method in order to possibly reach an unequivocal result in a renewed performance of the method. For this purpose it provided to switch from the fourth diagnostic operating mode into the first diagnostic operating mode when the mentioned condition is satisfied. Hereby it can be provided to first wait for a defined period of time so as to not immediately change back into the first diagnostic operating mode after determination of the rotational speed of the shaft and the subsequent comparison.

Finally it can be provided that when recognizing the first operating state, the second operating state or the third operating state, a defect of the phase angle detector is recognized. As mentioned above it can be generally advantageous to continue the diagnosis after recognition of the respective operating state. However, in order to keep the method as simple as possible it can also be provided that already when recognizing the corresponding operating state the defect of the phase angle detector is recognized.

The invention also relates to a drive device of a motor vehicle, in particular for implementing the method according to the description above, wherein the drive device has at least one electric machine with a phase angle detector and an output shaft which an be operatively connected with the electric machine. Hereby it is provided that the drive device is configured to perform a first diagnostic operating mode of the drive device when the return value of the phase angle detector is constant, wherein the operative connection between the electric machine and the output shaft is interrupted, subsequently the electric machine is regulated to a defined rotational speed and when the return value continues to remain constant a first operating state is recognized and otherwise a correct functioning of the phase angle detector is recognized. The advantages of such a configuration of the drive device and the method were mentioned above. The drive device and also the method can be refined according to the description above so that reference is made thereto.

BRIEF DESCRIPTION OF THE DRAWING

In the following the invention is explained in more detail by way of the exemplary embodiments shown in the drawing without limiting the invention. Hereby it is shown in the sole FIGURE a schematic representation of a motor vehicle with a drive device.

DETAILED DESCRIPTION OF PREFERRED EMBODIMENTS

The FIGURE shows a schematic representation of a motor vehicle 1, which has a drive device 2 and at least one driven axle 3 with wheels 4. The axle 3 is hereby drivable by means of the drive device 2. The drive device 2 has a drive aggregate 5, which is for example configured as an internal combustion engine. In addition the electric machine 6 is provided which can be controlled by means of a control device 7. The drive aggregate 5 can be operatively connected with the electric machine 6 via a separating clutch 8. The electric machine 6 is for example permanently and preferably rigidly operatively connected with an input shaft 9 of a shifting transmission 10. Via the shifting transmission 10 the electric machine 6 can be or is operatively connected with a here not shown output shaft of the drive device 2. The output shaft is for example an output shaft of the shifting transmission 10 and is preferably permanently and rigidly operatively connected with the axle 3 or the at least one wheel 4 of the axle 3.

The electric machine 6 has a phase angle detector 11, which is connected to the control device 7. Assigned to the shifting transmission 10 is preferably a rotational speed sensor 12, which serves for detecting the rotational speed of the input shaft 9 of the shifting transmission 10. Correspondingly the rotational speed of the electric machine 6 can also be determined By means of the rotational speed sensor 12. The shifting transmission 10 is configured so that multiple different transmission ratios between the input shaft 9 and the driven shaft or the output shaft can be established. In addition the shifting transmission 10 has a neutral position in which the operative connection between the input shaft 9 and the output shaft or the driven shaft is completely interrupted. In the neutral position of the shifting transmission 10 the electric machine 6 is thus completely decoupled from the axle 3 or the wheels 4. As an alternative or in addition a here not shown separating clutch can be provided for this decoupling.

Beside the wheels 4 of the driven axle 3 the motor vehicle 1 can of course also have non-driven wheels 13. As an alternative the wheels 13 are also assigned to a driven axle. Preferably in this case the driven axle of the wheels 13 is also operatively connected with the output shaft of the drive device 2, for example permanently and rigidly.

For the open loop control of the electric machine 6 the actual phase angle of the rotor or the motor shaft of the electric machine has to be known as accurately as possible. For determining this phase angle the phase angle detector 11 is provided, which for example operates incrementally. Preferably no signal is present at an output 14 of the phase angle detector 11 at a defined phase angle or at one of multiple defined phase angles, while a signal is present outside the phase angle or the phase angles. Of course also the opposite case can be provided i.e., that when the phase angle is present or one of the phase angles are present the signal is present, while outside the phase angle this is not the case.

When the return value of the phase angle detector 11 remains constant, in particular over a defined period of time, this may be because that the electric machine 6 does not rotate in spite of being controlled to generate a torque. However it may also be that the phase angle detector 11 and/or its connection line 15 to the control device 7 are defective. This means that when this case occurs it is desirable to perform a diagnosis to determine whether a defect is present or the drive device 2 or the motor vehicle 1 is stationary. For performing the diagnosis, reference is made to the description above.

By using the described drive device 2 and/or the method explained above a defect of the phase angle detector 11 can be determined fast and cost-effectively. Complicated retooling measures or additional sensors are not required.

What is claimed is:

1. A method for operating a drive device of a motor vehicle which has at least one electric machine with a phase angle detector and an output shaft operatively connectable with the electric machine, said method comprising:
when a return value of the phase angle detector of the electric machine is constant, performing a first diagnostic operating mode of the drive device, said performing of the first diagnostic operating mode comprising interrupting the operative connection between the electric machine and the output shaft, subsequent to the interrupting of the operative connection, controlling the electric machine by open loop control to a defined rotational speed, and when the return value continues to be constant after controlling the electric machine to the defined rotational speed, recognizing a first operating state of the phase angle detector and otherwise recognizing a correct function of the phase angle detector.

2. The method of claim 1, wherein the interrupting of the operative connection is performed by at least one of causing a shifting transmission to assume a neutral position and opening a shifting clutch.

3. The method of claim 1, wherein the drive device has a drive aggregate operatively connectable with the electric machine via a separating clutch, wherein upon initiation of the first diagnostic operating mode the operative connection is interrupted by means of the separating clutch.

4. The method of claim 1, further comprising when recognizing the first operating state performing a second diagnostic operating mode of the drive device, said second diagnostic operating mode comprising determining with a rotational speed sensor a rotational speed of a shaft that is permanently operatively connected with the electric machine, and when the rotational speed is different from zero recognizing a defect of the phase angle detector and otherwise recognizing a second operating state of the phase angle detector.

5. The method of claim 4, further comprising when recognizing the second operating state performing a third diagnostic operating mode of the drive device, said third diagnostic operating mode comprising adjusting the electric machine to the defined rotational speed by open loop or closed loop control, wherein the open loop control includes a pre-control of the electric machine to the defined rotational speed.

6. The method of claim 5, further comprising when the return value continues to be constant in the third diagnostic operating mode, recognizing a third operating state of the phase angle detector, and otherwise recognizing a correct functioning of the phase angle detector.

7. The method of claim 6, further comprising when recognizing the third operating state, performing a fourth diagnostic operating mode, said fourth diagnostic operating mode comprising determining with the rotational speed sensor the rotational speed of the shaft which is permanently operatively connected with the electric machine, and when the rotational speed of the shaft is different from zero recognizing a defect of the phase angle detector.

8. The method of claim 7, further comprising switching from the fourth diagnostic operating mode into the first diagnostic operating mode, when the rotational speed of the shaft in the fourth diagnostic operating mode is zero.

9. The method of claim 8, wherein the switching from the fourth diagnostic operating mode into the first diagnostic operating mode is performed after a defined period of time.

10. The method of claim 6, further comprising when recognizing the first operating state, the second operating state or the third operating state recognizing a defect of the phase angle detector.

11. A drive device of a motor vehicle, said drive comprising:
at least one electric machine with a phase angle detector and an output shaft operatively connectable with the electric machine, said drive device being configured
to perform a first diagnostic operating mode of the drive device when a return value of the phase angle detector is constant, said first diagnostic operating mode comprising interrupting an operative connection between the electric machine and the output shaft, subsequent to the interrupting of the operative connection controlling the electric machine by open loop control to a defined rotational speed, and when the return value continues to remain constant recognizing a first operating state and otherwise recognizing a correct functioning of the phase angle detector.

* * * * *